Oct. 22, 1935.   J. M. ROSHONG   2,018,421
ANTIFRICTION BEARING
Filed May 3, 1934
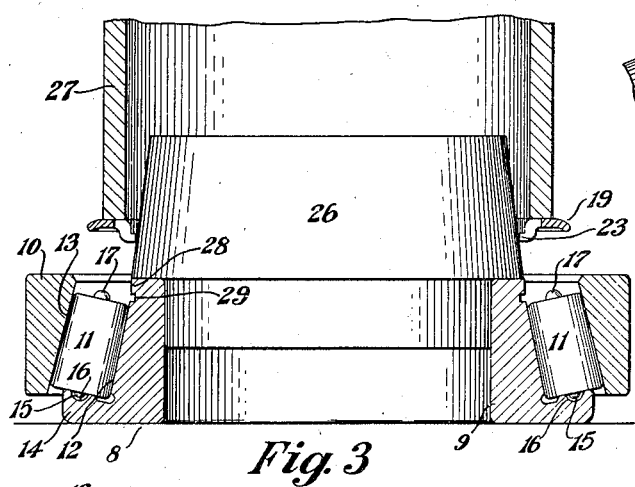
Fig. 3
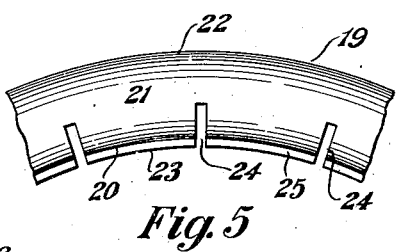
Fig. 5
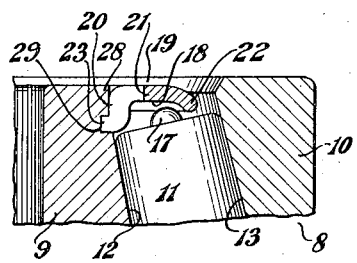
Fig. 4
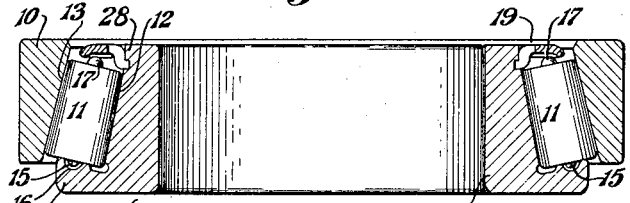
Fig. 2
Fig. 7
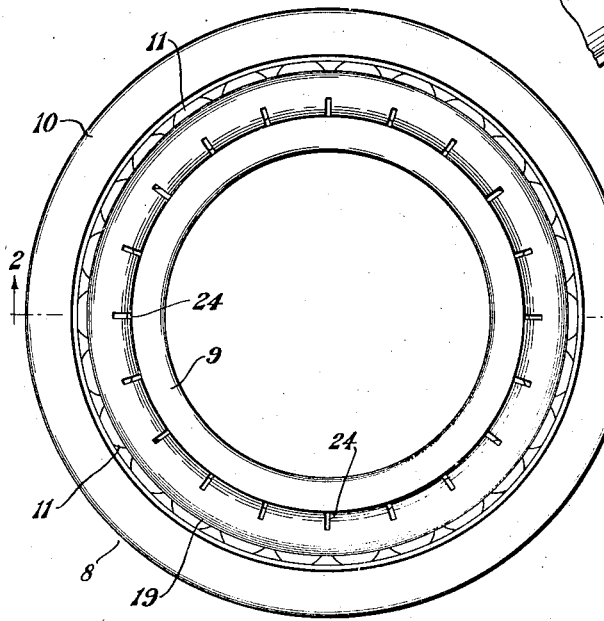
Fig. 1
Fig. 6
Inventor
Joseph M. Roshong
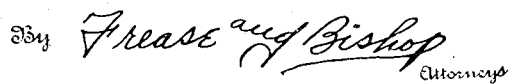
By Frease and Bishop
Attorneys

Patented Oct. 22, 1935

2,018,421

UNITED STATES PATENT OFFICE

2,018,421

ANTIFRICTION BEARING

Joseph M. Roshong, Canton, Ohio, assignor to Tyson Roller Bearing Corporation, Massillon, Ohio, a corporation of Delaware Application May 3, 1934, Serial No. 723,673

6 Claims. (Cl. 308—214)

The invention relates to anti-friction bearings, and more particularly to a closure or retaining ring construction for anti-friction bearings designed to hold the rotatable bearing members of a bearing in assembled relation to one of the raceway members of the bearing.

The improved retaining ring construction is particularly adapted for use in connection with a tapered roller bearing of the type shown in the Tyson Patent No. 1,851,551; although it is to be understood that the retaining ring construction may be easily adapted for use in connection with a cage type tapered roller bearing, a plain roller bearing, or a ball bearing.

A retaining ring has usually been assembled to an anti-friction bearing either in a removable or a permanent manner. The removable assembly of a retaining ring in an anti-friction bearing has heretofore usually been accomplished by using bolts, keys, or other locking devices; or by threading the retaining ring on one of the bearing raceway members; or by using a split retaining ring construction.

However, it is not desirable to provide a removable retaining ring bearing construction because the user should be supplied with a bearing that is a fixed or permanently assembled unit; so that a user cannot take the bearing apart and improperly reassemble the same. Moreover, a bearing retaining ring is sometimes accidentally displaced or sometimes becomes accidentally disassembled, when a removable retaining ring bearing construction is being installed or mounted in its place of use.

Likewise, when a split retaining ring bearing construction is used. the ends of the split ring sometimes do not spring to an entirely closed position; and in such event, one or more of the rotatable members, which should be retained by the ring, may fall or be taken out of assembled or retained position at the opening between the ends of the split ring.

These undesirable characteristics of a removable retaining ring bearing construction have been overcome to some extent in prior practice by providing a permanently mounted retaining ring construction; as by riveting or welding a retaining ring to a bearing raceway member, or by permanently expanding, contracting, shrinking, swaging, or flowing the metal of a retaining ring or a bearing raceway member to permanently connect a bearing retaining ring and a raceway member together. However, such permanently mounted retaining ring bearing constructions involve very expensive assembly operations and are therefore objectionable.

It is therefore an object of the present invention to provide a retaining ring construction for anti-friction bearings which may be readily, easily and inexpensively assembled permanently to a bearing raceway member.

These and other objects may be obtained by the anti-friction bearing construction, preferred embodiments of which are shown in the accompanying drawing, and are hereinafter described in detail and claimed, which may be stated in general terms as including in a bearing having inner and outer raceway members and rotatable members rolling on and between the raceway members, a continuous spring metal retaining ring having a notched annular portion interlocked and interconnected to one of the bearing raceway members.

In the drawing,

Figure 1 is a plan view of a tapered roller bearing embodying the improved retaining ring construction;

Fig. 2 is a transverse section through the bearing shown in Fig. 1, taken on the line 2—2, Fig. 1;

Fig. 3 is a view similar to Fig. 2 showing a preferred way of assembling the improved retaining ring to the bearing;

Fig. 4 is an enlarged transverse section of certain of the parts shown in Fig. 2;

Fig. 5 is an enlarged fragmentary plan view of the improved retaining ring shown in Figs. 1 to 4;

Fig. 6 is a fragmentary perspective view partly in section of the improved retaining ring; and Fig. 7 is a view similar to Fig. 5 of a slightly modified form of improved retaining ring.

Similar numerals refer to similar parts throughout the drawing.

The improved retaining ring construction is shown and described herein in connection with a tapered roller bearing generally indicated at 8 in Figs. 1, 2 and 3, which may include generally a cone 9, a cup 10 and rollers 11 rolling on and between the raceway surfaces 12 and 13, respectively, of the cup and cone. The cup and cone are illustrative of inner and outer raceway members of an anti-friction bearing, and the rollers 11 are illustrative of the rotatable members of an anti-friction bearing which roll on and between the raceway members.

In the type of tapered roller bearing shown in the drawing, a thrust or abutment flange 14 may be provided on one end of the cone 9 rigidly connected to or formed integrally with the larger end of the cone 9, against which the larger ends of each of the rollers 11 abut. In order to properly retain the rollers assembled on the cone when the cup is not in position, the larger end of each roller is preferably provided with a pintle 15 which runs in the annular groove 16 formed in the thrust flange 14; and the smaller end of each tapered roller 11 is likewise provided with a pintle 17 which is received within the annular groove 18 formed in the improved retaining ring generally indicated at 19.

The retaining ring 19, as best shown in Fig. 6, is a continuous ring made of spring metal and is provided with an inner annular, preferably cylindrical, shoulder 20 extending in an L-shaped manner from the main ring portion 21 of the retaining ring 19. The main ring portion 21 preferably terminates outwardly in a turned or curled outer edge 22 which forms with the portion 21 and shoulder 20 the groove 18 in which the pintles 17 of the rollers 11 are received.

The retaining ring shoulder 20 preferably terminates in an annular, preferably radial flange or inner edge 23 which projects inward from the shoulder.

As shown in the drawing, the retaining ring 19 is provided with a plurality of notches 24 which extend preferably radially of the ring through the inturned flange or edge 23, and the cylindrical L-shoulder 20, into the main ring portion 21 of the retaining ring.

The provision of the notches 24 provide tongue portions 25 on the retaining ring 19 which extend between the notches and comprise portions of the flange or edge 23 and the L-shoulder 20; and the tongues 25 may be sprung slightly when assembling the retaining ring upon and permanently securing the same to the cone 9 of the tapered roller bearing 8. This assembling may be accomplished by slipping the retaining ring over a tapered assembly plug 26, as shown in Fig. 3, and by then pushing the retaining ring downward by a tubular ram or plunger 27 so that the inner edge flanges 23 of each of the tongues 25 spring outwardly and pass over the end portion 28 of the small end of the cone 9, when the edge flanges spring into and become interlocked with the annular groove 29 provided in the outer surface of the cone or inner raceway member adjacent to and spaced from the small end thereof.

The groove 29, as best shown in Fig. 4, is preferably rectangular or squared in cross section so that the rectangular or squared inner edge flange 23 of each tongue 25 of the retaining ring is securely seated and interlocked therein with the cylindrical L-shoulder 20 seated on the peripheral end portion 28 of the cone or inner raceway member 9 and with the outer surface of the main ring portion 21 substantially flush with the end of the cone or inner raceway member 9, as best shown in Figs. 2 and 4.

After the improved retaining ring 19 has once been assembled on the cone 9 and interlocked therewith, the same cannot be removed in any manner excepting by a complete severing of the ring with a hack saw, chisel or the like; thus providing a permanent assembly of the cone 9, the rollers 11 and the retaining ring 19.

The slots or notches 24 must extend entirely through the L-shoulder of the retaining ring in order to give sufficient resilience to the tongues 25 formed thereby, that the retaining ring may be resiliently expanded for assembling it on the inner raceway member 9 of the anti-friction bearing 8. Moreover, the radial depth of each of the notches 24 may extend any desired distance into the main ring portion 21 of the ring 19 depending upon the particular size, design and style of the bearing of which it forms a part.

Moreover, the provision of the notches 24 which communicate with the groove 18, provide passageways for the circulation of lubricant when the bearing is in operation.

It is not intended to limit the scope of the present invention to the particular width or number of notches 24 which are provided in the retaining ring, because the number of notches may be increased or decreased from those shown in Figs. 1 to 6, inclusive; and the width of the notches may be increased to form a generally zigzag or toothed inner periphery for the retaining ring as best shown in Fig. 7, wherein very wide notches 24a are provided.

The improved construction thus provides a retaining ring for anti-friction bearings which may be readily, easily, and inexpensively made and assembled permanently to a bearing raceway member; thus incorporating the ease of assembly of a removable retaining ring construction and the desirable characteristics of a permanently mounted retaining ring, while at the same time avoiding the undesirable characteristics of prior removable and permanently mounted retaining ring constructions.

I claim:—

1. In a tapered roller bearing having inner and outer raceway members and rollers rolling on and between said raceway members, an annular groove provided in the outer surface of the inner raceway member adjacent to and spaced from one end thereof, a continuous spring metal retaining ring having an inner cylindrical shoulder and an annular flange projecting radially inwardly from the shoulder, the shoulder and flange being provided with a series of notches, and the notched flange being resiliently sprung into and interlocked in said groove.

2. In a tapered roller bearing having inner and outer raceway members and rollers rolling on and between said raceway members, an annular groove provided in the outer periphery of the inner raceway member adjacent to and spaced from one end thereof, a continuous spring metal retaining ring having an inner cylindrical shoulder and a radial flange projecting inward from the shoulder, the shoulder and flange being provided with a series of radial notches, the notched flange being resiliently sprung into and interlocked in said groove, and the outer end face of said ring when interlocked being substantially flush with said end of the inner raceway member.

3. In a tapered roller bearing having inner and outer raceway members and rollers provided with end pintles rolling on and between the raceway members, an annular groove provided in the outer surface of the inner raceway member adjacent to and spaced from one end thereof, a continuous spring metal retaining ring having an annular groove in one surface receiving the pintles of one end of each of the rollers and having an inner cylindrical shoulder and an annular flange projecting radially inwardly from the shoulder, the shoulder and flange being provided with a series of notches, said notches extending to and communicating with said ring groove, and the notched flange being resiliently sprung into and interlocked in the raceway groove.

4. A retaining ring for an anti-friction bearing including an annular groove in one surface for receiving rotatable bearing members, a bore including a cylindrical shoulder and an annular flange projecting radially inwardly from the shoulder, the shoulder and flange being provided with a series of notches communicating with the groove, and the notched flange being adapted to be resiliently sprung for interlocking the same with a bearing raceway member.

5. In an anti-friction bearing having inner and outer raceway members and rotatable members rolling on and between the raceway members, an annular groove provided in the outer surface of the inner raceway member adjacent to and spaced from one end thereof, a continuous retaining ring having a notched annular edge, the notched edge of the retaining ring being resiliently sprung into and interlocked in said groove, and the outer end face of said ring when interlocked being substantially flush with said end of the inner raceway member.

6. In an anti-friction bearing having inner and outer raceway members and rotatable members rolling on and between the raceway members, a squared annular groove provided in the outer surface of the inner raceway member adjacent to and spaced from one end thereof, a continuous retaining ring having a notched squared inner annular edge, the notched squared edge of the retaining ring being resiliently sprung into and interlocked in said squared groove, and the outer end face of said ring when interlocked being substantially flush with said end of the inner raceway member.

JOSEPH M. ROSHONG.